United States Patent [19]

Hayashida et al.

[11] Patent Number: 5,320,192
[45] Date of Patent: Jun. 14, 1994

[54] REAR WHEEL STEERING DEVICE

[75] Inventors: Tatsuaki Hayashida, Kanagawa; Shozo Kawasawa, Tokyo; Katsushi Matsuda, Kanagawa, all of Japan

[73] Assignee: Mitsubishi Jidosha Kogyo Kabushiki Kaisha, Tokyo, Japan

[21] Appl. No.: 11,792

[22] Filed: Feb. 1, 1993

[30] Foreign Application Priority Data

| Feb. 1, 1992 | [JP] | Japan | 4-014283 |
| Feb. 7, 1992 | [JP] | Japan | 4-015812 |
| Feb. 7, 1992 | [JP] | Japan | 4-015845 |
| Aug. 28, 1992 | [JP] | Japan | 4-272247 |

[51] Int. Cl.$^5$ .............................. B62D 5/26
[52] U.S. Cl. .................. 180/140; 180/144; 280/119; 280/137
[58] Field of Search ........ 180/140, 79.4, 79.5, 180/144, 24.01; 280/680, 101, 100, 98, 119, 113, 137

[56] References Cited

U.S. PATENT DOCUMENTS

| 1,575,118 | 3/1926 | Lipcot | 267/30 |
| 1,830,149 | 11/1931 | Weinhardt | 267/52 |
| 2,560,501 | 7/1951 | Webster et al. | 180/24.01 |
| 2,693,354 | 11/1954 | Walter et al. | 267/262 |
| 2,788,224 | 4/1957 | Ramun et al. | 280/718 |
| 3,231,291 | 1/1966 | Kozicki et al. | 280/699 |
| 3,913,937 | 10/1975 | Longworth et al. | 280/680 |
| 4,342,469 | 8/1982 | Corner et al. | 280/718 |
| 4,638,877 | 1/1987 | Baumers et al. | 180/144 |

FOREIGN PATENT DOCUMENTS

| 0373389 | 6/1990 | European Pat. Off. |
| 2902728 | 1/1979 | Fed. Rep. of Germany |
| 1152033 | 6/1956 | France |
| 59-040915 | 4/1984 | Japan |
| 62-080163 | 4/1987 | Japan |
| 2114012 | 4/1990 | Japan |
| 3193516 | 8/1991 | Japan |

*Primary Examiner*—Richard M. Camby
*Assistant Examiner*—Kevin Hurley

[57] ABSTRACT

A rear wheel steering device is provided in a vehicle with a simple structure in which rear wheels are supported at both end portions of a rear axle housing along a width direction of a chassis in order to drive the vehicle more stably at high speeds. The rear wheel steering device includes a leaf spring device connected to a chassis through a shackle link, a pair of upper and lower rubber pad members for sandwiching a rear axle housing and a tightening device for tightening the rear axle housing to be applied with a predetermined compressive load so that a durability of the rubber pad is improved without any frictional abrasion.

23 Claims, 12 Drawing Sheets

REAR WHEEL STEERING DEVICE

BACKGROUND OF THE INVENTION

1. Field of the Invention

The present invention relates to a rear wheel steering device for a vehicle with a suspension member having a leaf spring.

2. Description of Related Art

Recently, a four wheel steering system or a device for steering rear wheels in accordance with front wheel steering has been recommended in order to improve an operation stability while driving a vehicle at high speeds.

However, in a conventional four wheel steering device, there are several problems for a vehicle, particularly for a truck in which rear wheels are supported by both end portions of a rear axle housing and the rear axle housing is held by a chassis through a leaf spring. For this type of vehicle, the rear axle housing of which both end portions are connected to the chassis through the leaf spring has to be revolved itself around a central point positioned on a center line of the chassis along a longitudinal direction when the vehicle is steered.

An example of rotating the rear axle housing a round the center point when the rear wheels are steered is described in Japanese Patent Laid Open Publication No. 63-212109 (1988) where a structure in which a leaf spring is movable along a longitudinal direction of the chassis with respect to a laminated support bracket for supporting the leaf spring against the chassis. Under the structure, a large and heavy leaf spring has to be moved along the longitudinal direction while rear wheels are steered so that a size of a hydraulic cylinder for actuating a steering operation has to become larger and related devices such as a hydraulic control valve and a hydraulic power source have to become larger. Such a condition makes it impossible to provide an economical system.

Japanese Patent Laid Open Publication No. 62-194976 (1987) describes a steering system for steering a rear axle housing directly. Under the structure, a rear axle housing frictionally slides against a leaf spring so that a sliding surface is remarkably abraded. This abrasion is a serious problem in view of a durability of the rear wheel steering device.

SUMMARY OF THE INVENTION

An object of the present invention is to provide an economical rear wheel steering device with a simple structure in which rear wheels are supported at both end portions of a rear axle housing along a width direction of a chassis in order to drive the vehicle more stably at high speeds.

To accomplish the above purpose, a rear wheel steering device according to an embodiment of the present invention comprises a leaf spring device, the front and rear end portions of the leaf spring device connected to a chassis through a shackle link, a rear axle housing, a pair of upper and lower rubber pads for sandwiching the rear axle housing and a tightening device for tightening the rear axle housing to be applied with a predetermined compressive load.

According to an embodiment of the present invention, the rear axle housing is connected to the leaf spring device through the pair of upper and lower rubber pad members applied to the predetermined compressive load, so that the rubber pad members can be sheared flexibly along the longitudinal direction of the chassis. Thereby, the rear axle housing can be moved relatively smoothly with respect to the leaf spring device. The leaf spring device is connected to the chassis through slidable shackle links at both ends of the leaf spring device, so that the leaf spring device can be easily moved along the longitudinal direction.

In an embodiment of the present invention, the rear axle housing can be easily moved with respect to the leaf spring and the leaf spring device can be moved easily along the longitudinal direction with respect to the chassis. Thus, the rear axle housing can be rotated round a central point on a central line of the chassis along the longitudinal direction easily by a rear wheel steering actuator and it is possible to steer rear wheels smoothly. Further, a size of the rear wheel steering actuator can be reduced. In the present embodiment, the frictional abrasion of the rod members is reduced so much so that a durability of the rear steering device can be improved.

A preferred embodiment according the present invention comprises a rear axle housing, a leaf spring device, tightening devices for tightening the rear axle housing at the leaf spring device, an upper supporting member provided on an upper rubber pad member, a lower supporting member provided under a lower rubber pad member, a spacer provided between the upper and lower supporting members for controlling a clearance between the upper and lower supporting members, a pair of front and rear U-shaped bolts provided at front and rear sides of the rear axle housing, two leg portions of each U-shaped bolt for sandwiching the leaf spring device and penetrating both supporting members, and nuts provided at each tip end of leg portions of each U-shaped bolt for tightening the supporting members. Under the structure, a stable rear wheel steering operation is accomplished.

Another preferred embodiment according to the present invention comprises a pair of rubber pad members including a pair of U-shaped back plates having a shallow groove portion, wall portions extended from the groove portion and a rubber pad fixed between the U-shaped back plates. A rear axle housing is arranged between the wall portions of the rubber pad members, so that the rubber pad is prevented from deforming largely and a durability of the rubber pad can be improved. Further, by providing at least one protruding portion for extending toward the longitudinal direction of the chassis and confronting tightening devices at the wall portions of the back plates, it is possible to prevent the rubber pad from deforming and the durability of the rubber pad can be improved even more.

A further preferred embodiment of the present invention comprises a pair of rubber pad members having a pair of V-shape back plates of which a top portion is removed and a rubber pad fixed between the back plates. By providing a plane surface for contacting with an upper surface or a lower surface of a rear axle housing and inclined portions extended from both ends of the plane surface toward the longitudinal direction of the chassis at each back plate sheared deformation is applied to the inclined portions of the rubber pad so that a tensile load is not actuated. Thus, a durability of the rubber pad is improved.

Another preferred embodiment of the present invention comprises a rear axle housing, a laminated spring device and a stopper for controlling a relative displacement of the rear axle housing along the width direction of the chassis with respect to the laminated spring device within a predetermined amount. Thus, a rubber pad member is prevented from extremely shearing along the width direction.

Another preferred embodiment comprises a pair of front and rear shackle links. One shackle link is arranged toward an upward direction and the other shackle link is arranged toward a downward direction. Under the structure, a displacement of the rear axle housing along a vertical direction can become less when rear wheels are steered. As a result, a smooth rear wheel steering device is operated and a size of a rear wheel steering actuator can become more small.

Additionally embodiments of the present invention will be explained with reference to the following description. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which can given by way of illustration only, and thus are not limitative of the present invention and wherein.

DETAILED DESCRIPTION OF THE PREFERRED EMBODIMENTS

The embodiments according to the present invention will be described with reference to the attached drawings. FIG. 1 through FIG. 8 show the first embodiment of the present invention. In the drawings, 10 refers to a chassis of a vehicle such as a truck. The chassis 10 includes a pair of right- and left- side rails 12 extending along a longitudinal direction of the chassis and a plurality of cross members 14 extending along a width direction of the chassis, with both end portions for each of the cross members 14 being fixed at the side rails 12. 16 refers to a rear axle housing. Tires 18 are supported at each of the end portions of the rear axle housing 16, respectively. 20 refers to a main leaf spring (a leaf spring device) of which a front end portion is attached at an upper end of the first shackle link 22 by a pin 24 and a rear end portion is attached at a lower end of the second shackle link 26.

Figure 3:
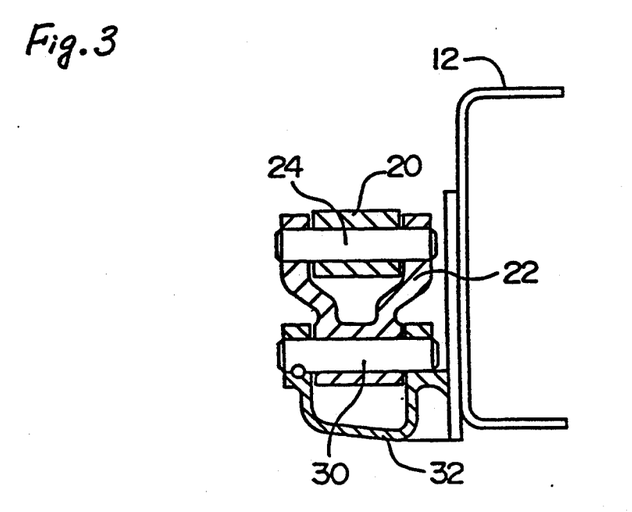
FIG. 3 shows a cross sectional view of a front end portion of a main leaf spring attached to a chassis.
Figure 4:
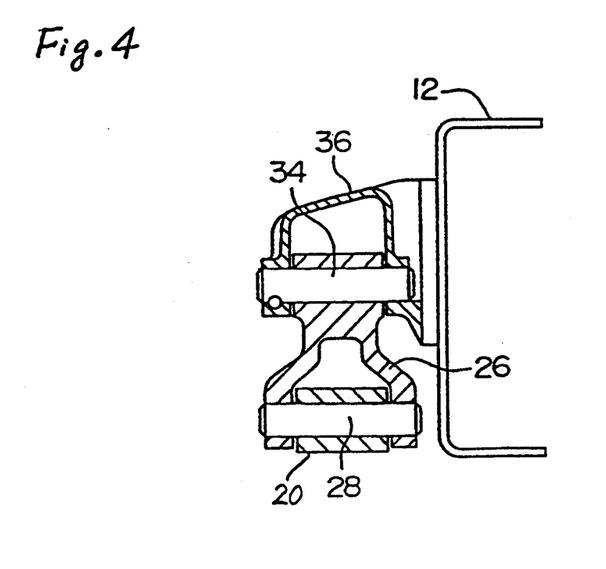
FIG. 4 shows a cross sectional view of a rear end portion of the main leaf spring attached to the chassis.

As shown in FIG. 3, the lower end of the first shackle link 22 is attached to a front shackle bracket 32 by a pin 30. The front shackle bracket 32 is fixed at the side rail 12. As shown in FIG. 4, an upper end of the second shackle link 26 is attached to a rear shackle bracket by a pin 34 and the rear shackle bracket 36 is fixed at the side rail 12.

A force loaded at a part under the spring is applied at a front end portion of the main leaf spring 20 along a downward direction through the first shackle link 22 and a force loaded at a part above the spring is applied at the rear end portion of the main leaf spring 10 along an upward direction through the second shackle link 26.

38 refers to a helper leaf spring provided on the main leaf spring 20. The helper leaf spring 38 is slidable at both end portions by help stoppers 40 when the vehicle weight is over the predetermined weight.

Figure 5:
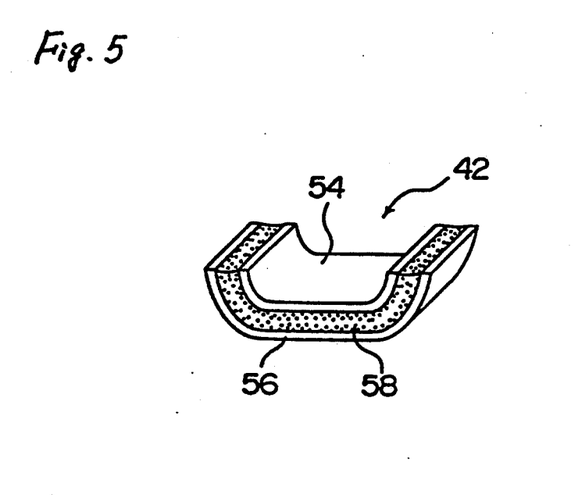
FIG. 5 shows an enlarged perspective view of a rubber pad member provided between the main leaf spring and a rear axle housing.

At an upper side surface and a lower side surface of each end portion of the rear axle housing 16, rubber pad members 42 as shown in FIG. 5 are provided, respectively. The upper supporting member 44 is provided on the upper rubber pad member 42 and the lower rubber pad member 42 is provided on the lower supporting member 46. A spacer 48 is inserted between the upper supporting member 44 and the lower supporting member 46. A pair of U-shaped bolts 50 are provided at a middle portion of the main leaf spring 20 and the helper leaf spring 38. Leg portions of each of the U-shaped bolts 30 are inserted into the upper and lower supporting members 44 and 46 and a pipe-shaped spacer 48. Both ends of each of the U-shaped bolts 60 are tightened by the nuts 52 so that the both end portions of the rear axle housing 16 is connected to the main leaf spring 20 and the helper leaf spring 88 through the rubber pad members 42, respectively.

Each of the rubber pad members 42 include a pair of U-shaped steel back plates of which a groove portion is shallow and a U-shaped rubber pad 58 is inserted and backed between the U-shaped steel back plates.

As described above, when the U-shaped bolts 50 are tightened, a pipe-shaped spacer 48 having a predetermined length is inserted between the upper and lower supporting members 44 and 46, so that a predetermined compressive force is loaded on the U-shaped rubber pads 58. In the first embodiment, although a leaf spring device for holding the rear wheels includes the main leaf spring 20 and the helper leaf spring 30, it is possible to omit the helper leaf spring 38.

Figure 1:
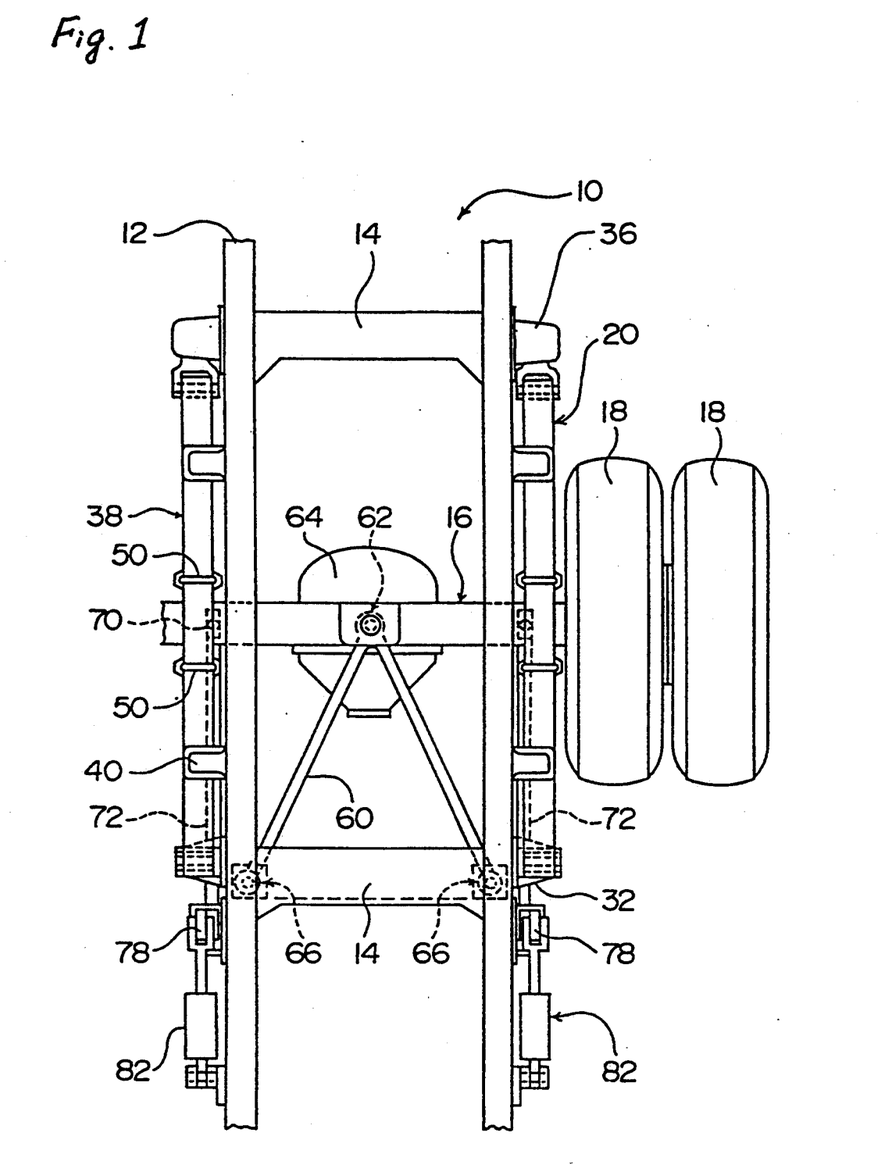
FIG. 1 is a plane view of a main part of the first embodiment of the present invention.

A radius rod 60 is provided between the side rails 12 of the chassis 10. The radius rod 60 has a V-shape and extends horizontally along the longitudinal direction of the chassis 10. A cross point of the V-shape is located on a center line of the chassis 10. The cross point is attached at an upper side of a differential casing 64 provided at a central portion of the rear axle housing 16 through a ball joint device or a rubber bush joint device 62. Both free end portions of the V-shaped rod 60 are attached at the side rail 12 or a cross member 14 through the ball joint device 66, respectively.

Figure 2:
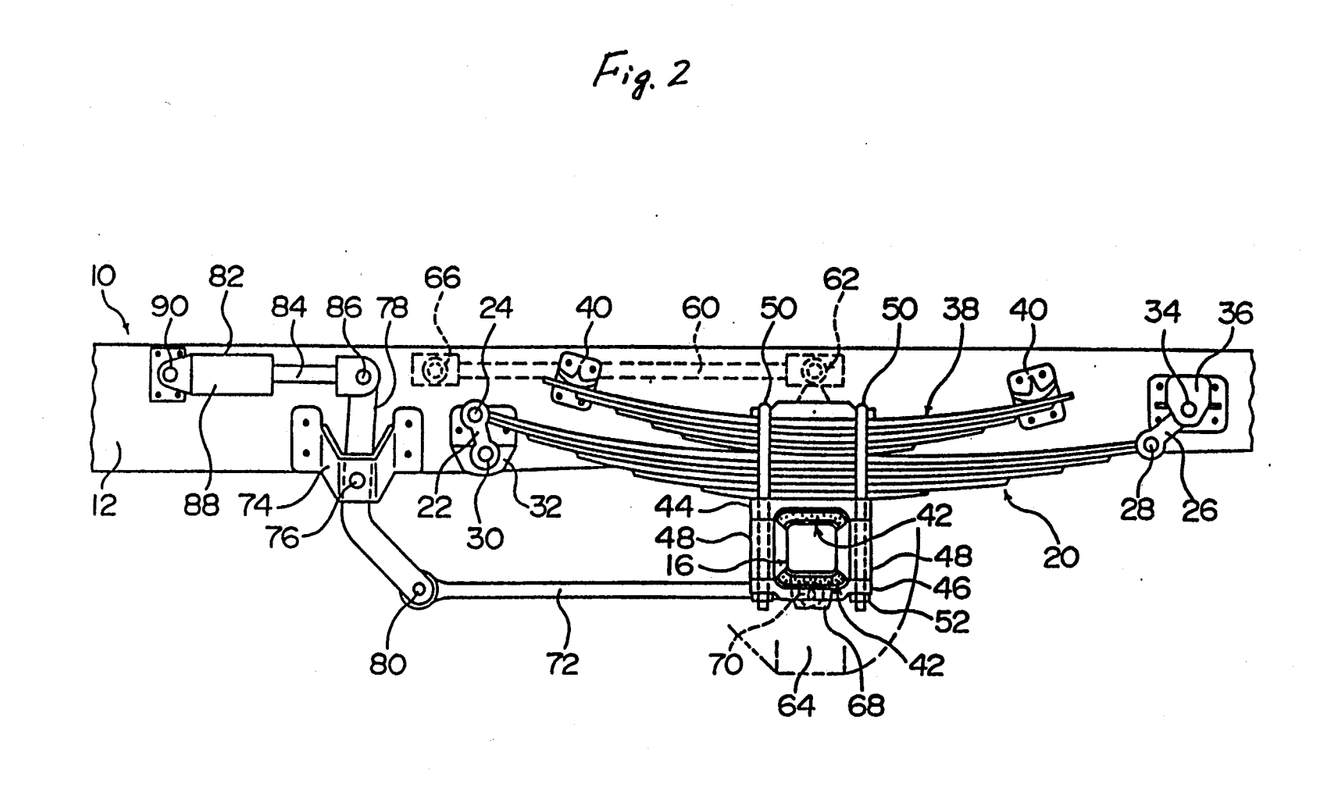
FIG. 2 is a side view of a rear wheel steering device as shown in FIG. 1.

As shown in FIG. 2, a bracket 68 is fixed at a portion near each end portion of the rear axle housing 16 by welding. One end of each rod of a pair of right- and left-lower radius rods 72 is attached at the bracket 68 through a ball joint or a rubber bush joint device 70, respectively. The opposite end of each rod of the pair of right- and left-lower radius rods 72 is pivotably attached at a lower end of an operation lever 78 by a pin 80. The operation lever 78 is pivotably supported by a pin 76 attached at a bracket 74 mounted on a web or a side wall of the side rail 12. A piston axis 84 of a hydraulic cylinder device 82 for forming a rear wheel steering actuator is pivotably attached at the upper end of the operation lever 78 by a pin 86. A cylinder 88 of the hydraulic cylinder device 82 is mounted on a web or a side wall of the side rail 12 by a pin 90.

Figure 6:
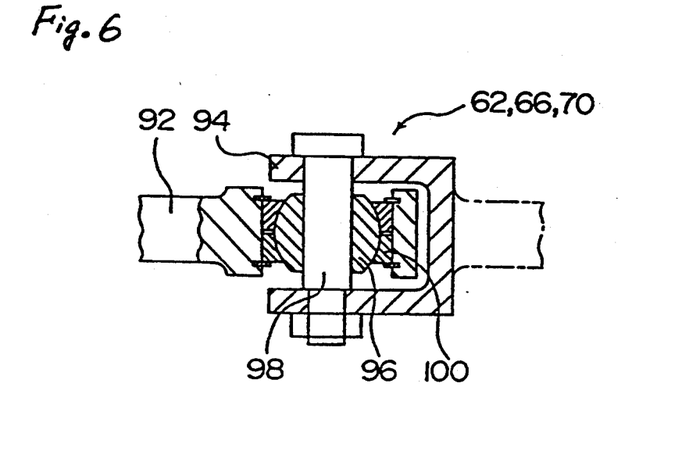
FIG. 6 shows a cross sectional view of a ball joint as shown in FIGS. 1 and 2.

A structure of one example of the above described ball joint devices 62, 66 and 70 is shown in FIG. 6. In FIG. 6, 92 is the upper radius rod 60 or the lower radius rod 72 which forms one of the members for producing a relative rotational displacement. 94 is the rear axle housing 16 and the bracket 68 which forms another of the members. An axis 98 with a spheric member 96 is supported by the another member 94. A ball sheet 100 for contacting with the spheric member 96 is supported by the member 92. Under the structure, the member 92 is freely rotated in a plane perpendicular to the axis 98 and a plane including the axis 98 with respect to the member 94.

Figure 8:
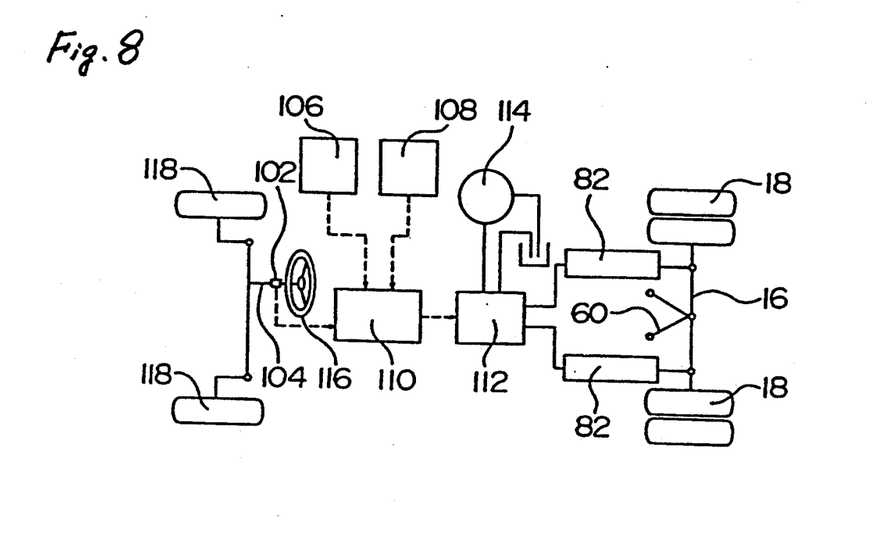
FIG. 8 shows an operation control unit of a rear wheel steering actuator as shown in FIG. 1.

FIG. 8 shows a simple structure of a control unit for controlling an actuation of the rear wheel steering actuator 82. In FIG. 8, 102 refers to a non-contacting light pulse sensor for detecting a steering angle provided at a steering shaft. 106 refers to a car speed sensor and 108 refers to a yaw rate sensor. 110 refers to a control unit for controlling a control valve 112 which actuates the rear wheel steering actuator 82 by receiving a steering angle signal from the steering angle sensor 102, the car speed signal from the car speed sensor 106 and a yaw rate signal from the yaw rate sensor 108. 114 refers to a hydraulic pump.

When a vehicle is driven at high speeds and front wheels are steered in accordance with an operation of a steering wheel 116, the control unit 110 receives the steering angle signal from the steering angle sensor 102, the car speed signal from the car speed sensor 106 and the yaw rate signal from the yaw rate sensor 108 and outputs a drive signal to the control valve 112. Then, the control valve 112 is actuated and a hydraulic fluid pumped from the hydraulic pump 114 is supplied to a pair of the rear wheel steering actuators 82. While one of the rear wheel steering actuators 82 is extended, the other rear wheel steering actuator 82 is shrunk.

Usually, in a case that rear wheels are steered in order to improve a stability of a vehicle driving at high speeds, the rear wheels are steered at a small angle, for example, 1°–5° toward the same steering direction of the front wheels. However, it is possible to utilize a new rear wheel steering system, which the rear wheels are firstly turned toward the opposite steering direction of the front wheels at a small angle and at the same moment the rear wheels are steered at a small angle toward the same steering direction of the front wheels.

Figure 7:
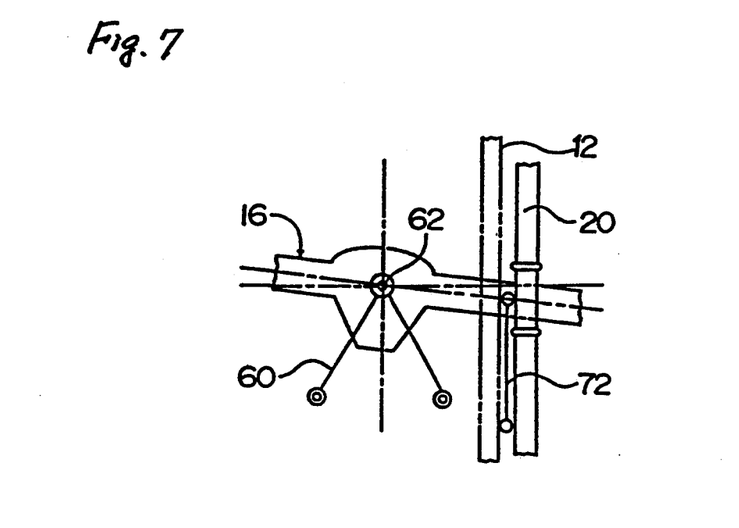
FIG. 7 is a plane view showing an operation of the rear axle housing for steering rear wheels.

When a vehicle drives at high speeds and the front wheels 118 are steered, the control valve 112 is actuated in accordance with a signal from the control unit 110 and a pair of the rear wheel steering actuators 82 are actuated in different directions to each other. One end portion of each operation lever 78 is connected to the piston axis 64 of the actuator and the operation levers 78 rotate toward the different directions to each other. The other end portion of each operation lever 78 is connected to the lower radius rod 72. While one of the lower radius rods 72 is pulled toward a front direction, the other lower radius rod 72 is pushed toward a rear direction. As a result, as shown in FIG. 7, the rear axle housing 16 revolves to a predetermined steering angle, that is, 1° around a cross point 62 of the V-shaped upper radius rod 60 clockwisely or counterclockwisely so that the stability for driving a vehicle at high speeds is improved. When the rear axle housing 16 is rotated for steering, the U-shaped rubber pad 58 of the rubber pad member 42 inserted between an end portion of the rear axle housing 16, and the main leaf spring 20 and the helper leaf spring 38 is flexibly deformed since the U-shaped rubber pad 58 is applied with a compressive load. By producing a flexible shearing deformation of the U-shaped rubber pad 58, the main leaf spring devices 20 and the helper leaf spring 38 are smoothly rotated with respect to the rear axle housing 16.

Upon comparing a conventional device in which the whole leaf spring devices are moved along the longitudinal direction when the rear wheels are steered and the present embodiment, a capacity of the hydraulic cylinder 82, a volume of relative valve devices and a hydraulic source of the present embodiments can be reduced. The same type vehicle, which is not equipped with a rear steering, may use the main leaf spring 20 and the helper leaf spring 38 for holding the rear axle. Shackle links 22 and 26 and shackle bracket 32 and 36 of the present embodiment in common. Thereby, the cost of the product can be reduced.

In addition, in the conventional device, the rear axle housing frictionally slides against the leaf spring device. In the embodiments of the present invention, it is not necessary to use any member which is remarkably abraded. A pair of upper and lower U-shaped rubber pads 58, which have a shallow groove portion, sandwich a rear axle housing. When the rear wheels are steered, front and rear leg portions of the U-shaped rubber pad 58 are sheared and moved with upper and lower surfaces of the rear axle housing, so that a rubber pad is not largely deformed. As a result, the durability of the rubber pad is improved.

In accordance with a vertical movement of the rear axle housing with respect to the chassis 10 when the vehicle is driven at high speeds or the rear wheels are steered, such a movement is received as a load by the main leaf spring 20 and the helper leaf spring 38. At that time, the rear axle housing 16 acts as a parallel link movement by the upper radius rod 60 and the lower radius rod 72.

Further, the upper radius rod 60 is attached at the rear axle housing 16 and the chassis 10 through the ball joint devices 62 and 66 or the similar rubber bush joint devices. Therefore, when a vehicle drives on a rough road or turns on a road and the rear axle housing 16 swings to the left and right, a deformation caused by such a movement is not prevented.

Further, in the first embodiment, as shown in FIGS. 3 and 4, the force loaded at the part above the spring is applied to an upward direction at a front end portion of the main leaf spring 20 through the first shackle link 22 and the force loaded at the part under the spring is applied to a downward direction at the rear end portion of the main leaf spring 20 through the second shackle link 26. Regarding the above steering operation, the force loaded at a part above the spring is actuated to return the rear axle housing 16 toward a neutral position so that steering is maintained easily.

Figure 9:
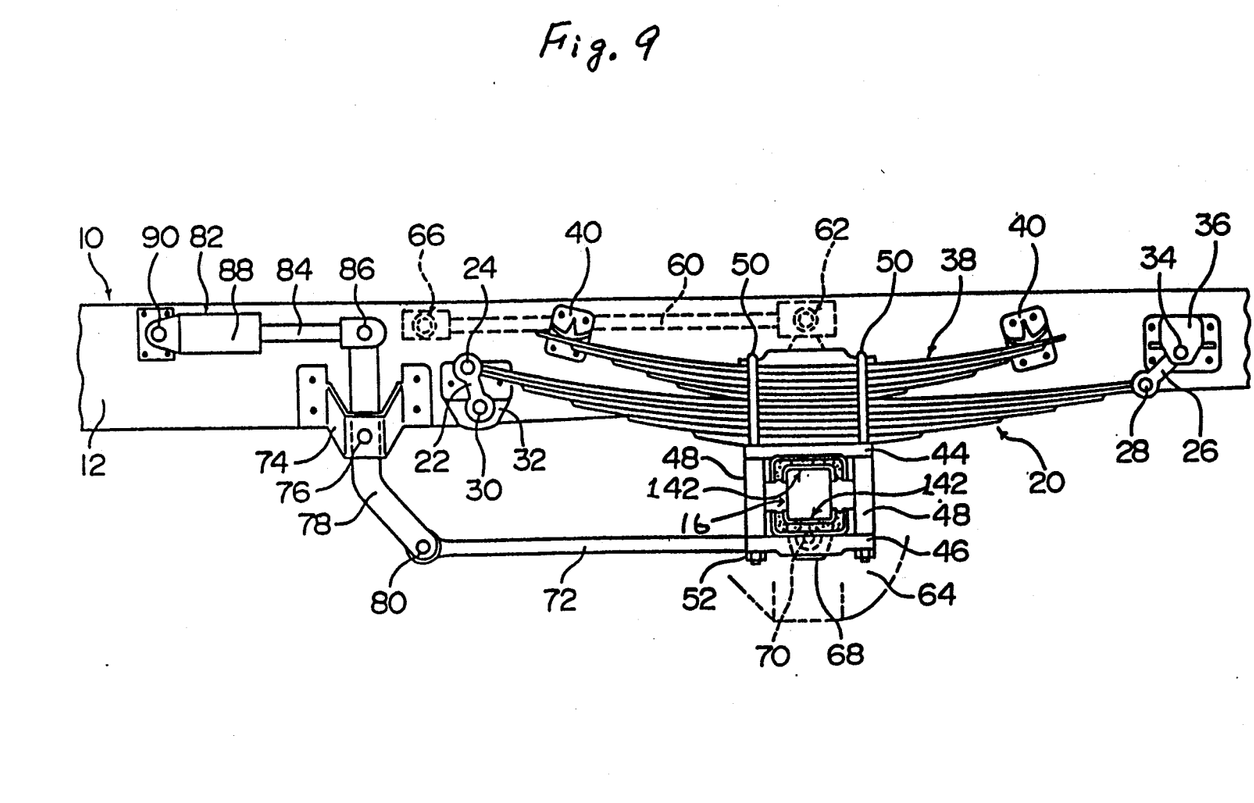
FIG. 9 shows a side view of a rear wheel steering device of the second embodiment of the present invention.
Figure 10:
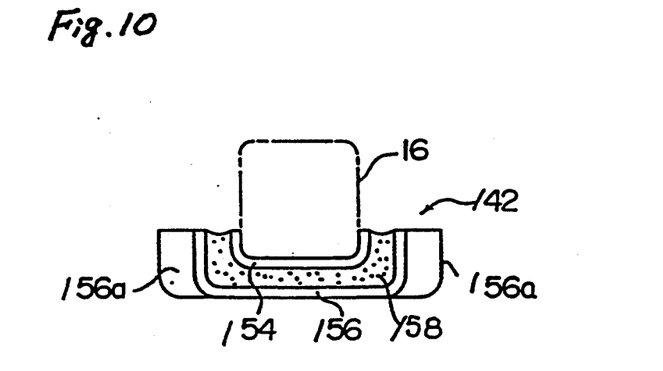
FIG. 10 shows an enlarged side view of a rubber pad member between a leaf spring and a rear axle housing as shown in FIG. 9.
Figure 11:
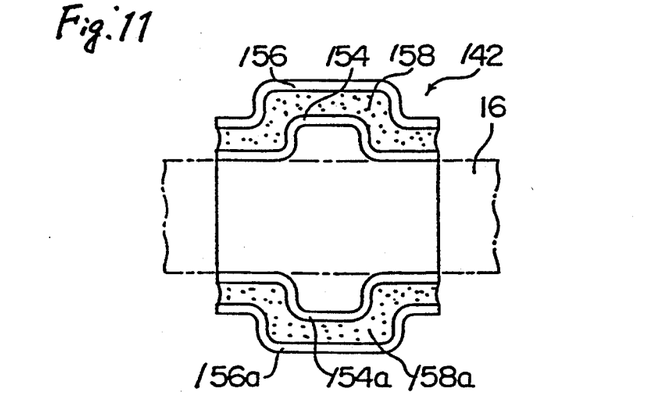
FIG. 11 shows an enlarged plane view of the rubber pad member as shown in FIG. 10.

FIG. 9 through FIG. 11 show the second embodiment of the present invention. In the second embodiment, the same members corresponding to the first embodiment have the same numerals, respectively. Therefore, the detailed description thereof is omitted.

In the second embodiment, as shown in FIG. 9, a pair of upper and lower rubber pad members 142 are used instead of the rubber pad members 42 used in the first embodiment. Although the rubber pad members 142 are formed in a U-shape having a shallow grooved potion, as shown in FIG. 11, back plates 154 and 156 have protruded portions 154a and 156a extending along the longitudinal direction of the chassis 10. The protruded portion 158a is formed at a rubber pad 158 sandwiched between the protruded portions 154a and 156a.

According to the second embodiment, the same effect of the first embodiment is obtained. Further, although one of the rear wheels 18 is run over any step and the rear axle housing 16 is inclined along a vertical direction, the rubber pad 158 is prevented from deforming largely under the spring load along the width direction of the chassis 10. Therefore, the durability of the rubber pad 158 can be improved.

Figure 12:
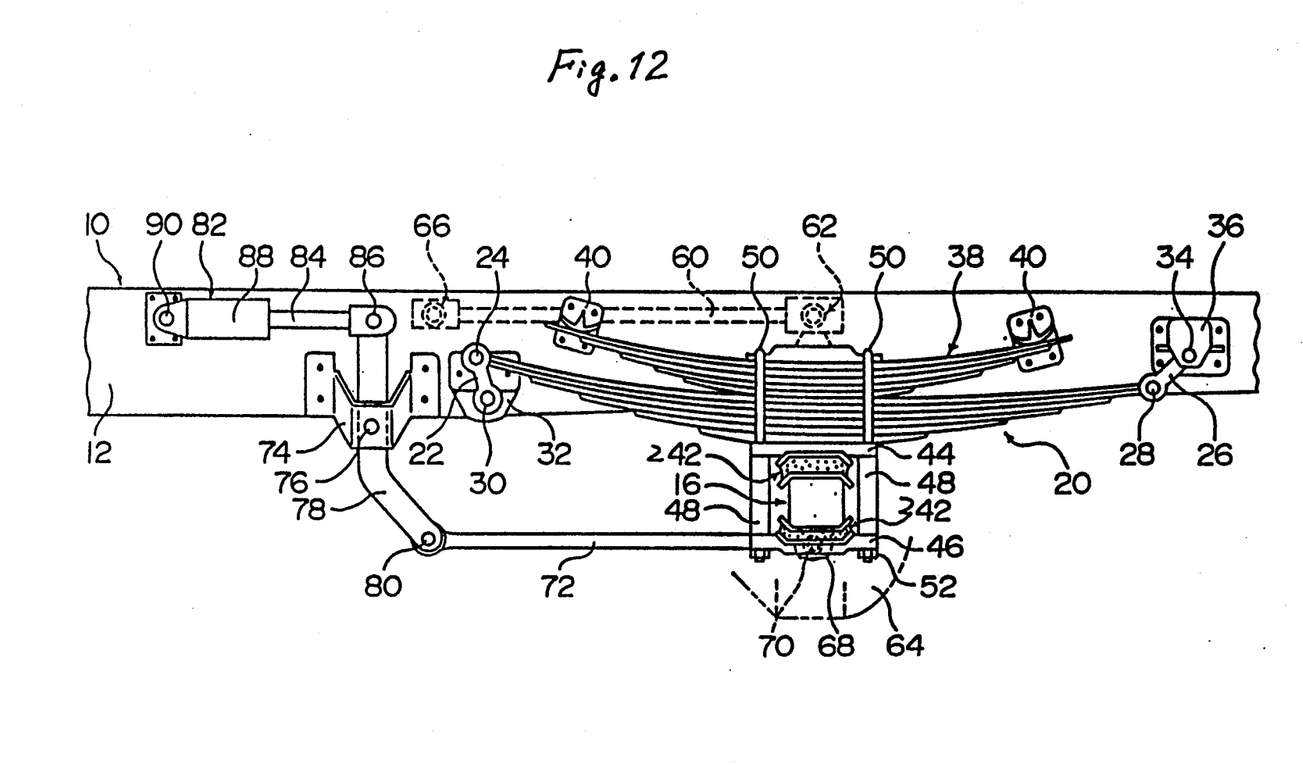
FIG. 12 shows a side view of a rear wheel steering device of the third embodiment of the present invention.
Figure 13:
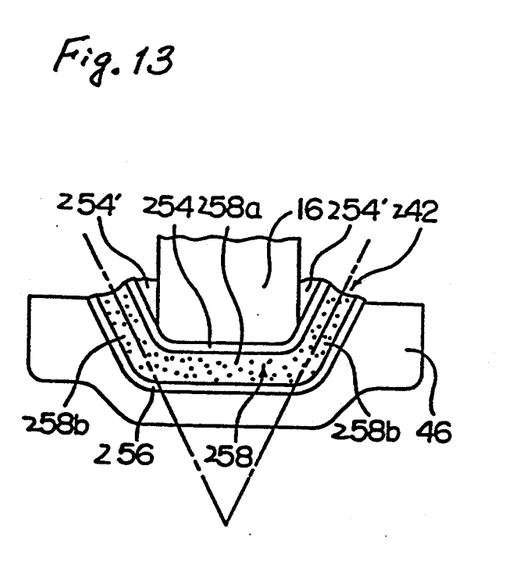
FIG. 13 shows an enlarged side view of a part of a connected portion between a leaf spring and a rear axle housing as shown in FIG. 12.

FIGS. 12 and 13 show the third embodiment of the present invention. In the third embodiment, the same members corresponding to the first and second embodiments have the same numerals, respectively. Therefore, the detailed description thereof is omitted.

In the third embodiment, as shown in FIG. 13, a different rubber pad member 242 is used. The rubber pad member 242 includes a pair of steel back plates 254 and 256 of which a cross section is an isolated trapezoid without a top side or a V-shape Without a top portion and a V-shaped bracket type rubber pad 238 backed between the back plates 254 and 256. In other words, the V-shaped bracket type rubber pad 258 has a plane surface portion 258a for confronting with an upper side surface or a lower side surface of the rear axle housing 16 and a pair of inclined portions 258b extended from both ends of the plane surface portion 258.

At a pair of V-shaped inclined surfaces of the pair of upper side and lower side back plates 254 of the rear axle housing 16, at least one protruding portion 254' for contacting with the front side surface or the rear side surface of the rear axle housing 16 is provided, respectively.

When the U-shaped bolts are tightened, a pair of spacers 48, each spacer having a predetermined length, are inserted between the upper and lower supporting members 44 and 46 so that a predetermined compressive force is applied to the plane surface portion 258a and the inclined portions 258b of the V-shaped bracket type rubber pad 258.

According to the third embodiment, when the rear axle housing 16 is steered, the rear axle housing 16 is relatively rotated smoothly with respect to the main leaf spring 20 and the helper leaf spring 38 caused by a flexible shearing on the deformation of the plane surface portion 258a and the inclined surfaces 258b of the V-shaped bracket type rubber pad 258. A suitable compressive force is applied on the plane surface 258a and the inclined surface portions 258b of the V-shaped bracket type rubber pad 258 of the rubber pad member 242 provided between each end portion of the rear axle housing 16 and the main leaf spring 20 and the helper leaf spring 38.

When the rear axle housing 16 is turned in accordance with a steering operation, a tensile force is not applied to the inclined surface portions 258b of the V-shaped bracket type rubber pad 258 so that the durability of the V-shaped bracket type rubber pad 258 is remarkably improved.

Figure 14:
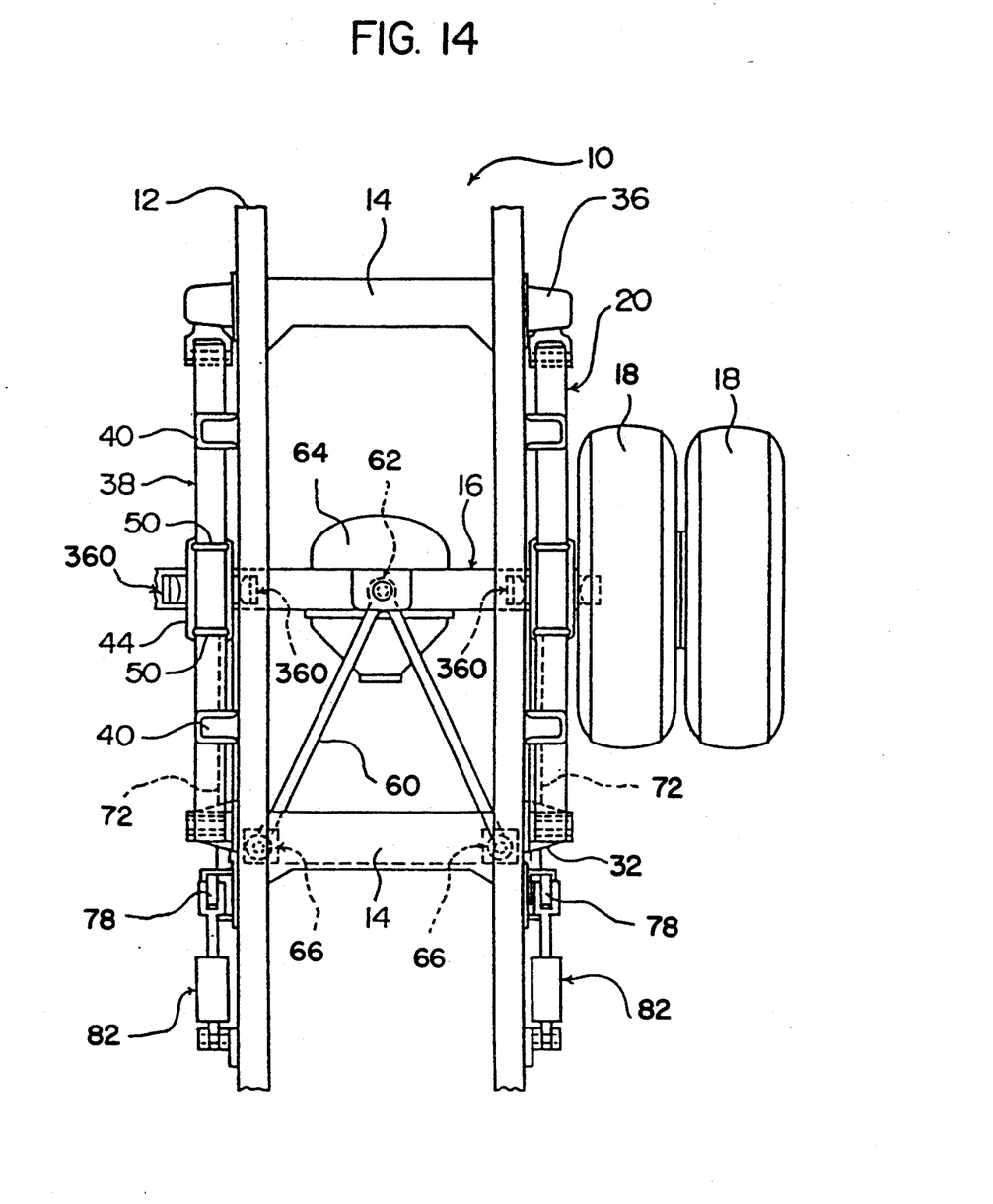
FIG. 14 shows a plane view of an essential part of a rear wheel steering device of the fourth embodiment of the present invention.
Figure 15:
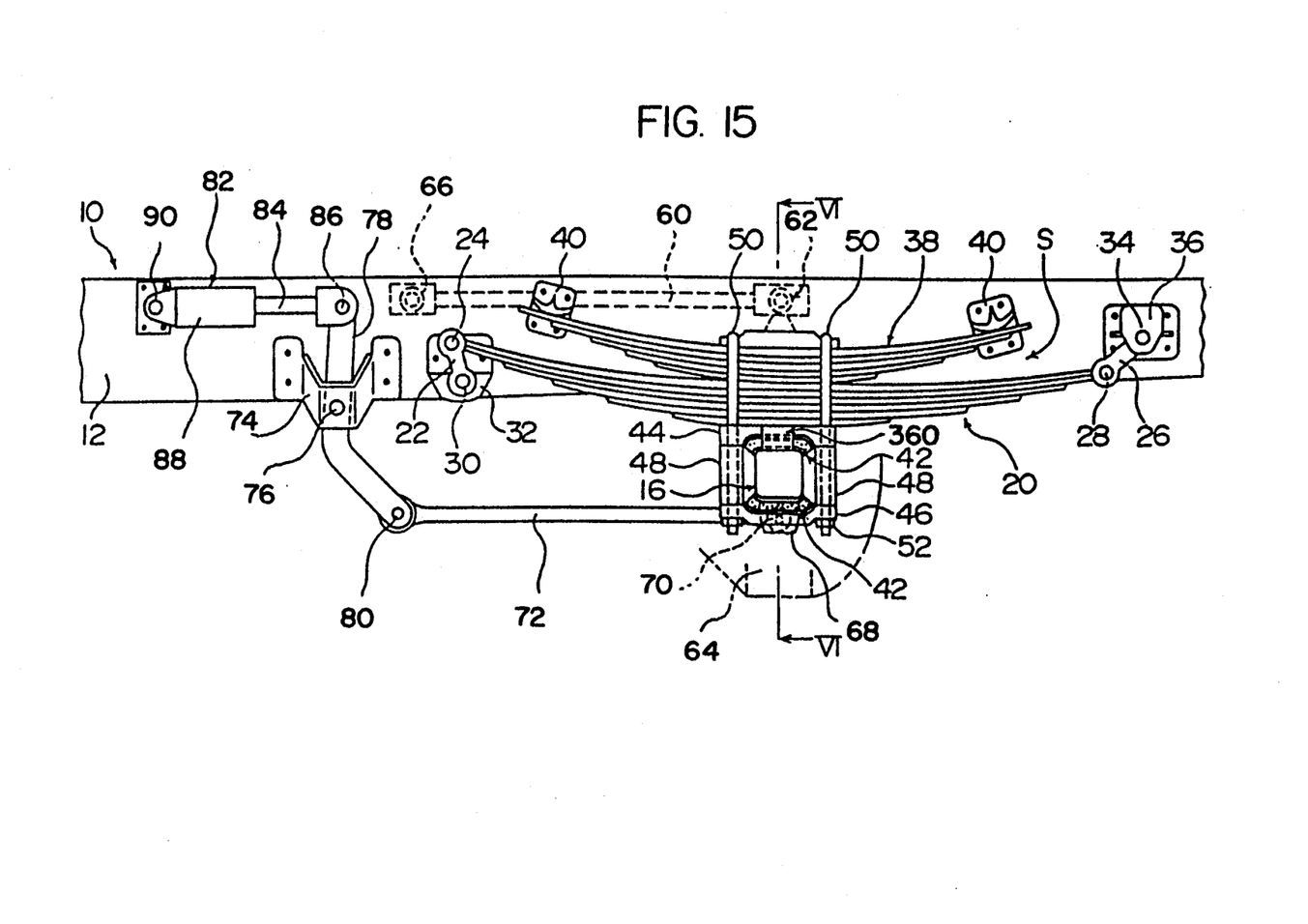
FIG. 15 is a side view of the rear wheel steering device as shown in FIG. 14.
Figure 16:
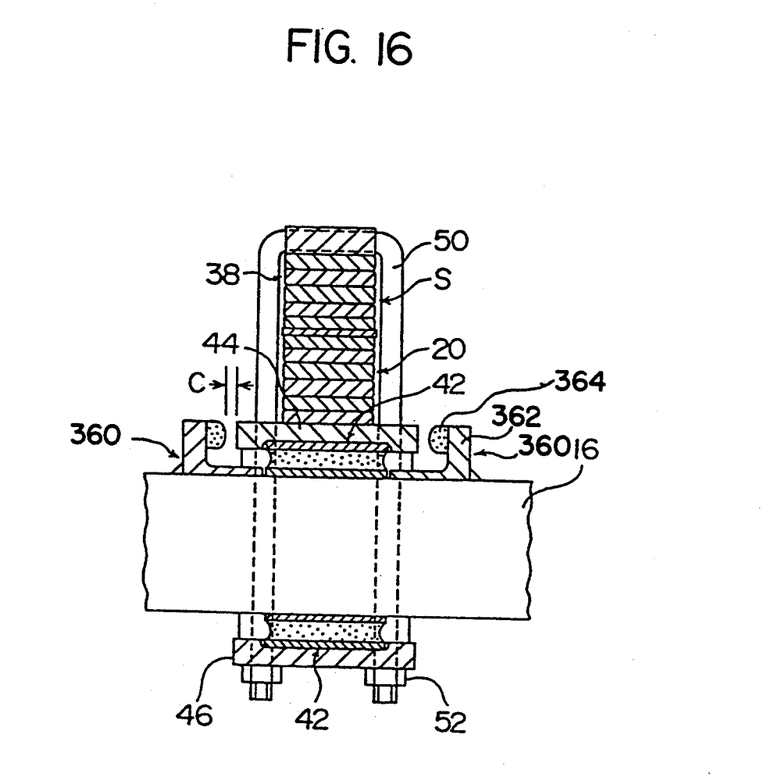
FIG. 16 is an enlarged cross sectional view of an essential portion along a line VI—VI as shown in FIG. 15.

FIG. 14 through FIG. 16 show the fourth embodiment of the present invention. In the fourth embodiment, the same members corresponding to the first embodiment have the same numerals, respectively. Therefore, the detailed description thereof is omitted.

In the fourth embodiment as shown in FIG. 14 through FIG. 16, a pair of stopper devices 360 is provided on both end portions of the rear axle housing 16 along the width direction of the chassis 10, respectively.

Each stopper device 360 includes a pair of L-shaped members 362 welded on the upper side surface of the rear axle housing 16 and a rubber buffer member 364 backed at a side surface of the L-shaped member 362 confronting with the upper supporting member 44. In a neutral position as shown in the drawings, a predetermined clearance C is provided between the buffer member 364 and the upper supporting member 44. A relative displacement of the rear axle housing 16 along the width direction of the chassis 10 with respect to the main leaf spring 20 and the helper leaf spring 38 is adjusted within a predetermined amount by the predetermined clearance C. A durability of the rubber pad 58 can be improved by controlling a shearing deformation of the rubber pad 58 within the safety level.

In the fourth embodiment, the same rubber pad 58 utilized in the first embodiment is used. The rubber pad 158 utilized in the second or third embodiment may also be used.

According to the fourth embodiment, the same effect of the first embodiment can be obtained. Further, by providing stopper devices 360 at the front and rear sides of the main leaf spring 20 on the rear axle housing 16, if one of rear wheels 18 is run over any step, the relative displacement of the rear axle housing 16 along the width direction of the chassis with respect to the leaf spring S is adjusted within the predetermined amount. Therefore, a large shearing deformation is not applied to the rubber pad 58 along the width direction and the rubber pad can be prevented from breaking and the durability of the rubber pad can be improved.

In the fourth embodiment, as shown in FIG. 14, a pair of the stopper devices 360 is provided on both sides of the leaf main spring 20, respectively. However, it is possible to provide the stopper device 360 at only one of the sides of the main leaf spring 20. Also a pair of stopper devices 360 may be provided at inner and outer sides of both front and rear sides of the main leaf spring 20, respectively.

In the third embodiment, the L-shaped member 362 with a buffer member 364 is provided on the rear axle housing 16. Furthermore, it is possible to fix the buffer member 364 on the upper supporting member 44 and to provide a protruding portion confronting with the buffer member 364 with the clearance C at the rear axle housing 16.

In the above described first through fourth embodiments, Although a vehicle has one axis for front wheels, the same steering systems can be utilized for a vehicle having two rear wheel axes, that is, a front rear axle and a rear rear wheel axle. Ordinarily, the rear rear axis is a dead axle which does not transmit a driving force. However, the steering system equipped to the rear rear wheel axis is substantially the same as the other.

The invention being thus described, it will be obvious that the same may be varied in many ways. Since variations are not to be regarded as a departure from the spirit and scope of the invention, all such modifications as would be obvious to one skilled in the art are intended to be included within the scope of the following claims.

We claim:

1. A rear wheel steering device comprising:
   a chassis;
   a rear axle housing for supporting a pair of rear wheels at both end portions of said rear axle housing along a width direction of said chassis;
   a pair of leaf spring devices connected to said rear axle housing along each side of said chassis in said width direction of said chassis through tightening devices disposed at a longitudinal direction of said chassis;
   a pair of rear wheel steering actuators disposed on said chassis for revolving said rear axle housing around a rotational center positioned on a central line of said chassis along said longitudinal direction of said chassis;
   a plurality of pairs of slider shackle links for respectively connecting both end portions of each of said leaf spring devices to said chassis;
   a pair of upper and lower rubber pad members for connecting said rear axle housing to each of said leaf spring devices; and
   compressive force applying means for applying a predetermined compressive force to said pair of upper and lower rubber pad members by said tightening devices in order to tighten said rear axle housing.

2. A rear wheel steering device as claimed in claim 1, wherein each of said tightening devices comprises
   an upper supporting member disposed on said upper rubber pad member,
   a lower supporting member disposed on said lower rubber pad member,
   a pair of spacers for adjusting a clearance between said upper and lower supporting members, and said spacers being disposed between said upper and lower supporting members,
   a pair of front and rear U-bolts, each of said front and rear U-bolt having two leg portions, each of said leaf spring devices being disposed between said two leg portions, and said two leg portions being inserted into said leaf spring devices, and
   a pair of nuts for fastening said two leg portions of said front and rear U-bolts at tip end portions of each of said two leg portions in order to tighten said upper and lower supporting members.

3. A rear wheel steering device as claimed in claim 2, wherein each of said spacers has a pipe shape and is inserted by said two leg portions of each of said front and rear U-bolts.

4. A rear wheel steering device as claimed in claim 1, wherein each of said upper and lower rubber pad members comprises
   a pair of U-shaped back plates having a shallow groove formed at a middle portion and wall portions,
   a rubber pad fixed between said pair of U-shaped back plates, and
   each end portion of said axle housing is disposed between said wall portions of said upper and lower rubber pad members.

5. A rear wheel steering device as claimed in claim 1, wherein said tightening devices are disposed near said rear axle housing, and
   at least one protruding portion is provided at said wall portions of said upper and lower rubber pad members and said protruding portion extends toward a longitudinal direction of said chassis for contacting with a respective one of said tightening devices.

6. A rear wheel steering device as claimed in claim 5, wherein each of said upper and lower rubber pad members comprises
   a pair of back plates having a V-shaped cross section of which a top portion is removed, and
   a rubber pad fixed between said pair of said back plates, and
   each of said tightening devices comprises
   a plane surface portion contacting with an upper surface or a lower surface of said rear axle housing, and
   inclined wall portions extending from each end portion of said plane surface portion toward a longitudinal direction of said chassis in order to form said V-shaped cross section.

7. A rear wheel steering device as claimed in claim 6, wherein at least one protruding portion is disposed at each of said inclined wall portions of said back plates and said protruding portion extends toward a longitudinal direction of said chassis for contacting with a side surface of said rear axle housing.

8. A rear wheel steering device as claimed in claim 1, wherein at least one of said rear axle housing and said leaf spring devices comprises a stopper for adjusting a relative displacement of said rear axle housing along said width direction of said chassis with respect to said leaf spring device within a predetermined distance.

9. A rear wheel steering device as claimed in claim 1, wherein one of each pair of said shackle links is arranged to apply a force toward an upward direction and the other one of said pair of shackle links is arranged to apply a force toward a downward direction.

10. A rear wheel steering device as claimed in claim 9, wherein said pair of shackle links are arranged to be inclined along opposite directions to each other.

11. A rear wheel steering device as claimed in claim 1, further comprising V-shaped upper radius rod extending along said longitudinal direction of said chassis,
    wherein a middle point of said V-shaped upper radius rod is pivotably mounted on a central point of said rear axle housing along said width direction of said chassis and both free ends of said V-shaped upper radius rods are attached to said chassis, and said rear wheel steering actuators are operated to rotate said rear axle housing around said central point of said rear axle housing.

12. A rear wheel steering device as claimed in claim 11, wherein said upper radius rod comprises a V-shape.

13. A rear wheel steering device as claimed in claim 1, further comprising a pair of lower radius rods extending along said longitudinal direction of said chassis, said lower radius rods arranged symmetrically to each other, one free end of each of said lower radius rods being attached to said rear axle housing, and the other free end of each of said lower radius rods being connected to one of a pair of hydraulic cylinders, wherein the rear wheel steering is actuated by steering said pair of said lower radius rods in opposite directions to each other along said longitudinal direction by said hydraulic cylinders while a vehicle is steered.

14. A rear wheel steering device as claimed in claim 13 further comprising a shift lever, wherein each of said hydraulic cylinders is arranged along said longitudinal direction of said chassis, a middle portion of said shift lever is attached at said chassis, one end of said shift lever is connected to each of said hydraulic cylinders and the opposite end of said shift lever is connected to one of said pair of said lower radius rods.

15. A rear wheel steering device as claimed in claim 1, further comprising a control unit for controlling said rear wheel steering actuators to steer said rear wheels in accordance with a movement of a pair of front wheels while a vehicle drives at high speeds.

16. A rear wheel steering device as claimed in claim 15, wherein said control unit controls said rear wheel steering actuators in order to steer said rear wheels toward the same direction of said front wheels immediately after said rear wheels steer toward a different direction from said front wheels.

17. A rear wheel steering device for a vehicle, comprising:

a rear axle housing for supporting a air of rear wheels along a width direction of a chassis of the vehicle;

a leaf spring device connected to said chassis through a pair of shackle links;

a pair of upper and lower rubber pad members for connecting said rear axle housing to said leaf spring device by sandwiching said rear axle housing;

a tightening device disposed at a longitudinal direction of said chassis for tightening said rear axle housing by applying a predetermined compressive load so that said pair of upper and lower rubber pad members are prevented rom being frictionally abraded to increase the durability of said pair of upper and lower rubber paid members; and a pair of rear wheel steering actuators disposed on said chassis for revolving said rear axle housing around a rotational center positioned on a central line of said chassis along said longitudinal direction of said chassis.

18. A rear wheel steering device as claimed in claim 17, wherein said leaf spring device is connected to said rear axle housing along each side of said chassis along said width direction of said chassis through said tightening device disposed at said longitudinal direction if said chassis and said leaf spring device is disposed on said rear axle housing.

19. A rear wheel steering device as claimed in claim 17, further comprising a control unit for controlling said rear wheel steering actuators to steer said rear wheels in accordance with a movement of a pair of front wheels while the vehicle drives at high speeds.

20. A rear wheel steering device as claimed in claim 19, wherein said control unit controls said rear wheel steering actuators in order to steer said rear wheels toward the same direction of said front wheels immediately after said rear wheels steer toward a different direction from said front wheels.

21. A method for producing a rear wheel steering device of a vehicle, comprising the steps of:

(a) supporting a pair of rear wheels along a width direction of a chassis of the vehicle by a rear axle housing;

(b) connecting a leaf spring device to said chassis through a pair of shackle links:

(c) connecting said rear axle housing to said leaf spring device by sandwiching said rear axle housing with a pair of upper and lower rubber pad members;

(d) applying a predetermined load to tighten said rear axle housing by a tightening device disposed at a longitudinal direction of said chassis so that said pair of upper and lower rubber pad members are prevented from being frictionally abraded to increase the durability of said pair of upper and lower rubber members; and (e) revolving said rear axle housing around a rotational center positioned at a central line of said chassis along said longitudinal direction of said chassis by a pair of rear wheel steering actuators disposed on said chassis.

22. A method for rear wheel steering as claimed in claim 21, further comprising the step of controlling said rear wheel steering actuators by a control unit to steer said rear wheels in accordance with a movement of a pair of front wheels while the vehicle drives at high speeds.

23. A method for rear wheel steering as claimed in claim 22, wherein said step of controlling controls said rear wheel steering actuators in order to steer said rear wheels toward the same direction of said front wheels immediately after said rear wheels steer toward a different direction from said front wheels.

* * * * *